(12) United States Patent
Lischinski et al.

(10) Patent No.: US 9,100,570 B2
(45) Date of Patent: Aug. 4, 2015

(54) TONAL STABILIZATION OF VIDEO

(75) Inventors: Daniel Lischinski, Jerusalem (IL); Zeev Farbman, Jerusalem (IL)

(73) Assignee: Yissum Research Development Company of The Hebrew University of Jerusalem Ltd., Jerusalem (IL)

( * ) Notice: Subject to any disclaimer, the term of this patent is extended or adjusted under 35 U.S.C. 154(b) by 102 days.

(21) Appl. No.: 14/112,254

(22) PCT Filed: Apr. 18, 2012

(86) PCT No.: PCT/IB2012/051949
§ 371 (c)(1),
(2), (4) Date: Apr. 4, 2014

(87) PCT Pub. No.: WO2012/143870
PCT Pub. Date: Oct. 26, 2012

(65) Prior Publication Data
US 2014/0300767 A1     Oct. 9, 2014

Related U.S. Application Data

(60) Provisional application No. 61/476,355, filed on Apr. 18, 2011.

(51) Int. Cl.
*H04N 5/232* (2006.01)
*G06T 5/00* (2006.01)

(52) U.S. Cl.
CPC ............ *H04N 5/23232* (2013.01); *G06T 5/002* (2013.01); *G06T 2207/10016* (2013.01); *G06T 2207/20012* (2013.01); *G06T 2207/20028* (2013.01); *G06T 2207/20182* (2013.01)

(58) Field of Classification Search
CPC ............... H04N 5/23232; G06T 5/002; G06T 2207/20028; G06T 2207/20012; G06T 2207/10016; G06T 2207/20182
USPC ............... 348/208.6, 208.4, 208.1, 222.1; 382/254, 274, 275, 263–266, 362, 272
See application file for complete search history.

(56) References Cited

U.S. PATENT DOCUMENTS

2007/0047834 A1*  3/2007  Connell ................... 382/274
2008/0316327 A1* 12/2008  Steinberg et al. .......... 348/222.1

OTHER PUBLICATIONS

International Search Report of PCT Application No. PCT/IB2012/051949 dated Sep. 4, 2012.

(Continued)

*Primary Examiner* — Aung S Moe
(74) *Attorney, Agent, or Firm* — Pearl Cohen Zedek Latzer Baratz LLP

(57) ABSTRACT

A method of tonally stabilizing a video sequence is provided herein. The method includes the following stages: automatically selecting one or more anchor frames from a sequence of frames; obtaining an anchor adjustment map for each selected anchor frame; applying an edge-preserving smoothing algorithm to the sequence of frames; generating for any given pair of smoothed frames, a robust set of pixels indicating pixels affected by external tonal fluctuation only; initializing an adjustment map for any given frame by applying the anchor adjustment map to accumulated color differences between pixels of the robust set of the given frame and the anchor frame; and completing the initialized adjustment map by predicting values of pixels in each adjustment map not included in the robust set by applying an interpolation at a color space for these pixels, wherein the adjustment maps are usable for tonally aligning the video sequence with the anchor frame.

22 Claims, 4 Drawing Sheets

(56) References Cited

OTHER PUBLICATIONS

Francois Pitie et al: "A New Robust Technique for Stabilizing Brightness Fluctuations in Image Sequences" In: "Field Programmable Logic and Application", May 16, 2004, Springer Berlin, Heidelberg, Berlin, Heidelberg, vol. 3247, pp. 153-164.
Guillaume Forbin et al: "Nonlinear Flicker Compensation for Archived Film Sequences Using Motion-Compensated Graylevel Tracing", IEEE Transactions on Circuits and Systems for Video Technology, IEEE Service Center, Piscataway, NJ, US, vol. 18, No. 6, Jun. 1, 2008, pp. 803-816.
George D. Toderici et al: "Automatic, efficient, temporally-coherent video enhancement for large scale applications", Proceedings of the Seventeen ACM International Conference on Multimedia, MM '09, Oct. 19, 2009, p. 609, New York, New York, USA.
Eric P. Bennett et al: "Video Enhancement Using Per-Pixel Virtual Exposures", ACM Transactions on Graphics (TOG), ACM, US, Jan. 1, 2005, pp. 845-852.
Van Roosmalen B et al: "Correction of Intensity Flicker in Old Film Sequences", IEEE Transactions on Circuits and Systems for Video Technology, IEEE Service Center, Piscataway, NJ, US, vol. 9, No. 7, Oct. 1, 1999, pp. 1014-1015.

\* cited by examiner

TONAL STABILIZATION OF VIDEO

CROSS-REFERENCE TO RELATED APPLICATIONS

This application is a National Phase Application of PCT International Application No. PCT/IB2012/051949, International Filing Date Apr. 18, 2012, entitled "TONAL STABILIZATION OF VIDEO", published on Oct. 26, 2012 as International Publication Number WO 2012/143870, claiming priority of U.S. Patent Application No. 61/476,355, filed Apr. 18, 2011, both of which are incorporated herein by reference in their entirety.

BACKGROUND

1. Technical Field The present invention relates to video processing and more particularly, to applying tonal stabilization to video sequences.

2. Discussion of the Related Art

With the proliferation of inexpensive video capturing devices, and the increasing popularity of video sharing websites over the last few years, there has been a dramatic increase in the amount of captured video content. Most of this video footage is home-made and captured by amateur videographers using low-end video cameras.

While professional videographers may employ an elaborate setup to control the motion of the camera and the lighting of the scene, home-made video footage often suffers from camera shake and from significant fluctuations in exposure and color balance. These tonal fluctuations are induced by the camera's automatic exposure and white balance control: minute adjustments to these tonal settings are continuously made in response to changes in the illumination and the composition of the frame. Turning auto-exposure off is not a practical option, since the dynamic range of the scene is typically much greater than what the camera is able to capture with a fixed exposure setting, making it difficult to avoid over- and under-exposure. Turning off automatic white balance is more feasible, but not all cameras offer this option.

While video motion stabilization (elimination of camera shake effects) has been the subject of much research, elimination of tonal fluctuation, or tonal stabilization, got surprisingly little attention.

The digital video capture pipeline may be modeled as follows: the analog linear RGB values arriving at the camera's sensor are converted to digital values, undergo luma/chroma separation, processed to adjust brightness and color, and finally encoded to the target digital video format. Both the analog-to-digital conversion and the subsequent processing may involve non-linear operations. It is customary to refer to the combined effect of this pipeline as the camera's response function, which may vary between different cameras operating at different settings, and is typically proprietary. Had the camera response at each frame been known, it would be possible to stabilize the sequence by inverting the response function.

Some methods are known in the art for modeling and recovering the camera response, including parametric, semi parametric and non-parametric approaches. However, these methods typically operate on still, geometrically registered images, which vary only in their exposure. To apply them to video would require a sufficiently large set of exact correspondences between each pair of frames, which might be difficult to compute. Even if the required correspondences are available, the exposure change between successive frames is typically too small to produce a numerically stable result. Furthermore, it would be necessary to extend these methods to handle more general changes of the camera parameters.

At a first glance, it might seem that tonal alignment may be achieved simply by transferring color from a frame taken from a tonally stable section in the video sequence (hereinafter: an anchor frame) to the remaining frames. Indeed, a variety of color transfer methods have been proposed over the years. Some solutions known in the art proposed matching various global color statistics of two images, such as mean and variance in some color space. However, such methods cannot be used for tonal stabilization, since the statistics of a frame tend to vary significantly due to camera and object motion. These changes can occur quite quickly, and therefore any attempts to match the global statistics would result in introducing fluctuations of their own. Local methods, try to find a local match between regions in the image and fit a corresponding offset. While such transfer models are powerful, reliably matching regions in the presence of camera and scene motion remains a challenging task. Yet another significant problem in using both global and local methods in the context of frame-to-frame color transfer is that of error accumulation.

BRIEF SUMMARY

The present invention, in embodiments thereof, provides a method for reducing undesirable tonal fluctuations in video. These tonal fluctuations are minute changes in tonal characteristics, such as exposure, color temperature, brightness and contrast in a sequence of frames, which are easily noticeable when the sequence is viewed.

As different cameras may differ in their response functions and might employ different auto-exposure and white balance algorithms, embodiments of the present invention avoid making strong assumptions regarding the specifics of the camera's tonal response.

Embodiments of the present invention operate on a continuous video shot. Firstly, one or more frames are designated as anchor frames, typically located in parts of the shot where the tonal settings are stable. Sequences of successive frames are then tonally aligned with adjacent anchors: for each frame, a corresponding adjustment map is computed. The adjustment map indicates how each of its pixels should be modified in order to appear as if it was captured with the tonal settings of the anchor frame. This map is efficiently propagated from one frame to the next by taking advantage of temporal coherence. It is assumed that lighting conditions in the scene are not changing abruptly, and that the tonal fluctuations are of a global nature, rather than spatially varying across the frame.

In order to robustly assess the tonal changes between successive frames it is observed that, due to temporal coherence, most of the pixel grid points of any given frame sample the same scene surfaces in the next one. Thus, an easily computable set of rough correspondences may be extracted, making it possible to seed the values of the adjustment map in a large number of locations. Global consistency considerations are then used to propagate these values to the entire frame, obtaining a new complete adjustment map. Thus, the map is propagated between frames, while being gradually updated.

Advantageously, once a video sequence has been stabilized, it no longer suffers from undesirable fluctuations in exposure and in color. The tonally aligned video sequence thus becomes amenable to a variety of consistent tonal manipulations. For example, the entire sequence can be manually white-balanced by designating a patch in one of the frames as neutral grey. Also, a set of tone curves may be applied to modify the brightness and the contrast of the sequence.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
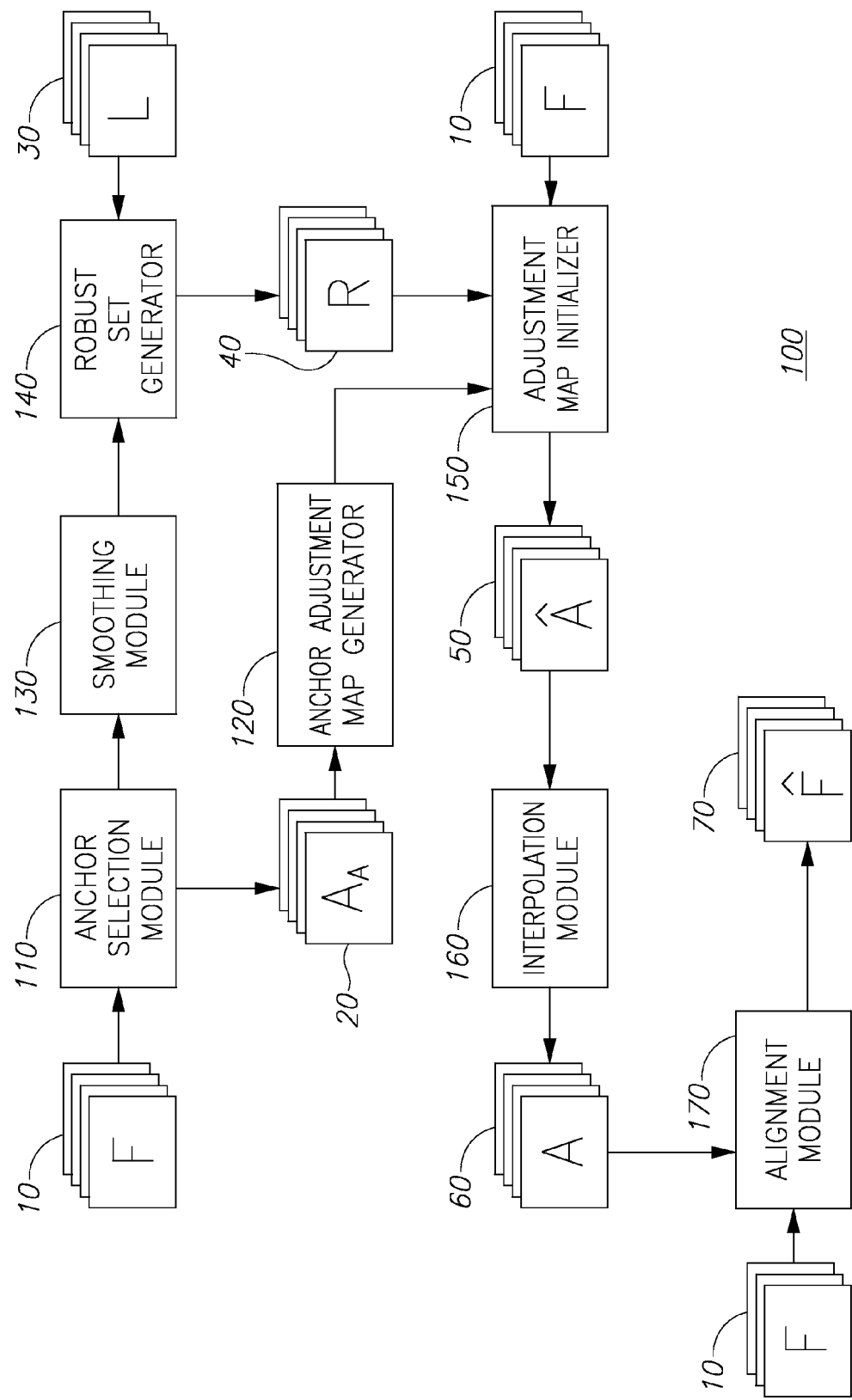
FIG. 1 is a high level schematic block diagram illustrating the system according to some embodiments of the invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating the system according to some embodiments of the invention. System 100 for tonally stabilizing a video sequence is presented by way of example only for illustration purposes only and should not be regarded as limiting the implementation of the present invention. System 100 includes a computer processor (not shown here), an anchor selection module 110 configured to automatically select one or more anchor frames 20 from a sequence of frames 20. System 100 may further include an anchor adjustment map generator 120 configured to generate an anchor adjustment map for each selected anchor frame. Alternatively, the anchor adjustment map may be provided from a different source to system 100. The anchor adjustment map indicates the tonal characteristics of the anchor frame and serves as a base adjustment map for the subsequent frames.

System 100 further includes a smoothing module 130 configured to apply an edge-preserving smoothing algorithm to the sequence of frames. The smoothed frames are then fed into a robust set generator 140 possibly together with corresponding luminance channel frames 30. Robust set generator 140 is configured to generate for any given pair of smoothed frames, a robust set of pixels 40 which is indicative of pixels of each frame that affected by external tonal fluctuation only. System 100 further includes an adjustment map initializer 150 configured to initialize an adjustment map for any given frame by applying the anchor adjustment map to accumulated color differences between pixels of the robust set 40 of the given frame and the respective anchor frame 20. Initializer 150 set pixels not included in robust set 40 to zero. Then, an interpolation module 150 is configured to complete the initialized adjustment map by predicting values of the zeroed pixels in each adjustment map not included in the robust set by applying an interpolation at the color space for these pixels. The completed adjustment maps 60 are then may be used by alignment module 170 to tonally align the original sequence of frames 10 to a tonally stabilized sequence of frames 70 which is tonally aligned with one or more of anchor frames 20.

Figure 2:
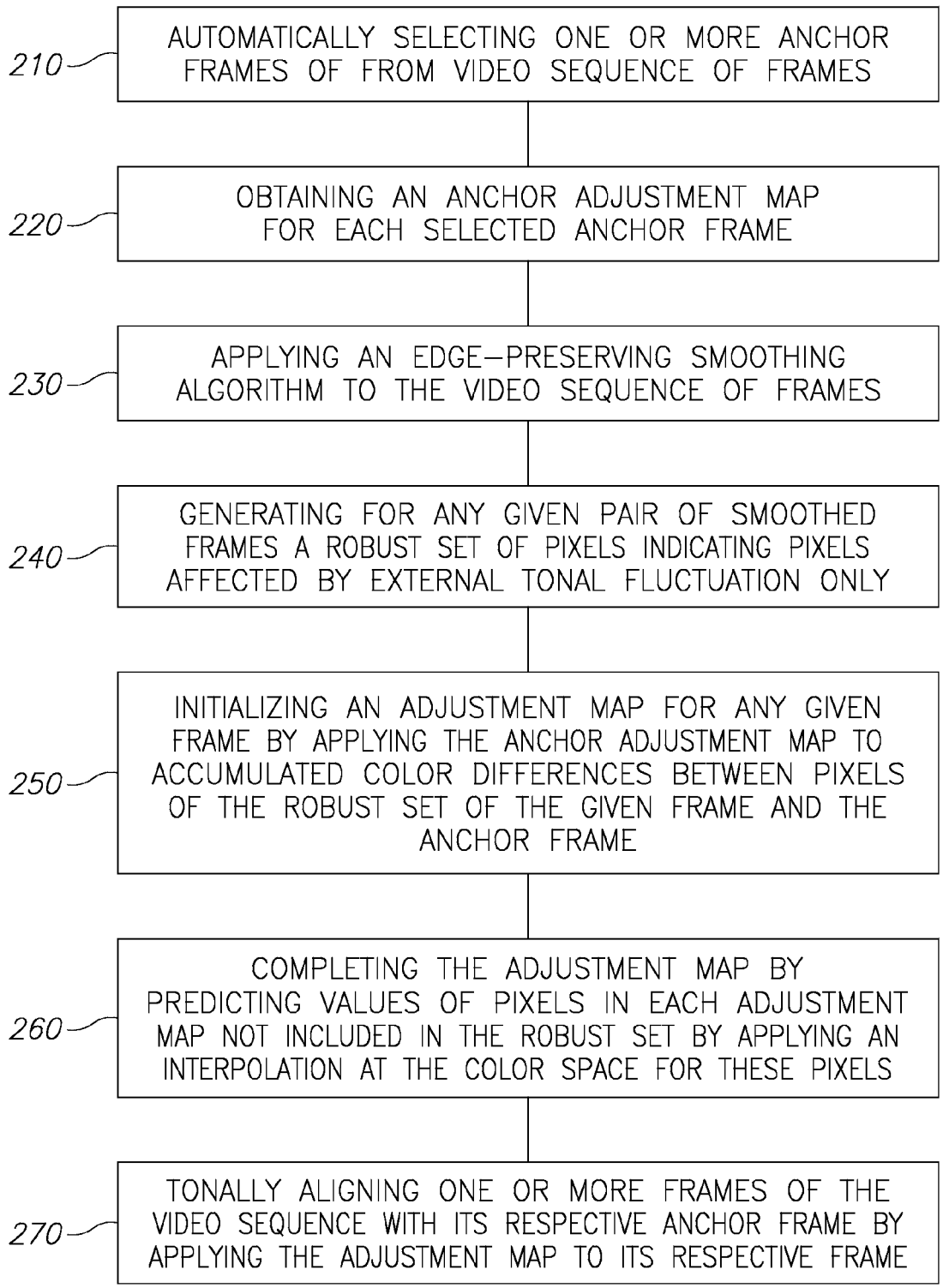
FIG. 2 is a high level flowchart illustrating an aspect according to some embodiments of the invention.

FIG. 2 is a high level flowchart illustrating a method 200 according to some embodiments of the invention. The method described below is not limited by the aforementioned architecture of system 100 described above. Method 200 starts of with automatically selecting one or more anchor frames from a sequence of frames 210. The method then goes on to obtaining an anchor adjustment map for each selected anchor frame 220 and applying an edge-preserving smoothing algorithm to the sequence of frames 230. Then the method proceeds to generating for any given pair of smoothed frames, a robust set of pixels indicating pixels affected by external tonal fluctuation only 240. Adjustment maps for the entire sequence of frames are then computed by initializing an adjustment map for any given frame by applying the anchor adjustment map to accumulated color differences between pixels of the robust set of the given frame and the anchor frame 250 and subsequently by completing the initialized adjustment map by predicting values of pixels in each adjustment map not included in the robust set by applying an interpolation at a color space for these pixels 260. Then, optionally, the sequence of frames may be tonally aligned with the anchor frames (one or more) by applying the completed adjustment maps to their corresponding frames 270.

Following is a more detailed description of a preferred embodiment used to implement the aforementioned system and method. It is understood though that the following embodiment is used for illustrative purposes only and that similar embodiments not described herein may be used to effectively implement the present invention.

In the preferred embodiment, for each frame $f_i$, an adjustment map $A_i$ is being computed. This map specifies for each pixel how its color channels should be adjusted to obtain the desired aligned value. Once the adjustment maps are computed, the aligned sequence is obtained simply by applying each map to its frame. Since the map at the anchor (aka the identity mapping) is known, the goal is a method for efficient and robust propagation of the maps along the frame sequence. More formally, we seek a method for computing $A_{i+1}$, given $f_i$, $A_i$, and $f_{i+1}$.

It has been observed that that due to high temporal coherence of video, most of the pixel grid points of any given frame $f_i$ sample the same scene surfaces in frame $f_{i+1}$. Thus, a set of rough correspondences may be computed, referred herein as the robust set $R_{i/i+1}$, and use them to seed the adjustment values in a large number of locations. $A_{i+1}$ is then completed via scattered data interpolation in color space. Before going further into the details of the preferred embodiment, a discussion of some assumptions and considerations is presented herein.

It is assumed that the camera's tonal transformations are global and reversible. It is noted that not every global transformation can be modeled by independent mappings of the color channels. For example, when the saturation of an image is adjusted, or a general (non-diagonal) white balance correction matrix is applied, the value of each channel in the resulting image depends on all three color channels of the original image, an effect that can only be approximated with three independent curves.

A richer model, which interleaves the channels and has more parameters, can better account for the variations in the data. The difficulty with using high dimensional models for tonal stabilization of video, however, is that they tend to overfit the data, and accumulate errors at each stage. Thus, accumulating (compositing) the transformations from one frame to the next results in a rapid degradation in the quality of the result, making it impossible to apply to sequences containing hundreds of frames.

In order to represent the tonal changes between the frames, the preferred embodiment uses an adjustment map, defined as a set of three per-pixel additive corrections, or offsets. For each frame, the luminance is firstly computed and then uses it to normalize the RGB channels. Thus, a separation between luminance and chroma carried out followed by representing the change at each pixel as one offset for the log-luminance channel, and two offsets for the chroma. It should be noted that because of operating on the log-luminance channel, the corresponding offset actually represents an exposure correction. This non-parametric model is expressive by construction, under adverse conditions it gracefully degrades to the equivalent of a much simpler and more limited model, which does not accumulate errors as fast.

Back to the preferred embodiment, a more detailed explanation of the algorithm is provided herein for computing the adjustment map $A_{i+1}$ given the frames $f_i$ and $f_{i+1}$, and the previous adjustment map $A_i$.

Given a pair of corresponding pixels between two frames, any difference between their colors may be attributed to several factors. A change in the tonal parameters of the camera is but one of these factors; the other major factors include changes in the diffuse and specular shading components. Ideally, the object of the preferred embodiment is to construct adjustment maps that reflect only those color changes that arise from varying the tonal settings of the camera. It is known in the art that edge preserving smoothing effectively attenuates specularities, as well as variations in diffuse shading and texture. Thus, a first step is to apply a bilateral filter to each frame, using a standard set of parameters: for example spatial sigma is approximately 10% of the smaller image dimension and range sigma is approximately 10% of the values range.

Next, a set of correspondences between the successive frames is efficiently being computed. This is based on the observation that, due to both spatial and temporal coherence, a large set of pixels in two successive frames is likely sample the same surfaces in the scene. These pixels are referred to herein as the robust set More precisely (and formally), let $L_i$ and $L_{i+1}$ denote the luminance channel of the smoothed frames $f_i$ and $f_{i+1}$, with $\mu(L)$ indicating the mean of the luminance channel. We define the robust set $R_{i/i+1}$ as the set of all pixels whose values in $L_i$ and $L_{i+1}$ differ by only a small amount:

$$R_{i/i+1} = \{x \ s \cdot t \cdot |(L_i(x) - \mu(L_i)) - (L_{i+1}(x) - \mu(L_{i+1}))| < 0.05\} \quad (1)$$

The underlying assumption of eq. (1) is that tonal fluctuations in the luminance channel can be approximated by a single shift parameter.

All the remaining pixels (whose luminance changed by more than 0.05) are considered likely to have been affected by factors other than a change in the camera's tonal settings, such as a change in the surface visible through the pixel.

Having computed the robust set $R_{i/i+1}$, it can now be used to initialize the adjustment map at these pixels, while temporarily assigning a value of 0 to the remaining pixels:

$$\hat{A}_{i+1}(x) = \begin{cases} A_i(x) + (f_i(x)\ f_{i+1}(x)), & \text{for each } x \in R_{i/i+1} \\ 0 & \text{otherwise} \end{cases} \quad (2)$$

In other words, the observed color difference is added at each pixel in the robust set to its previous value in $A_i$.

Next, to obtain $A_{i+1}$, the missing values (zeros) in $\hat{A}_{i+1}(x)$ need to be replaced. Since it is assumed that tonal fluctuations are global transformations, it is desirable that pixels with similar colors in $f_{i+1}$ to be assigned similar adjustments values in $A_{i+1}$, regardless of their spatial location. To achieve this, a fast scattered data interpolation scheme in color space may be employed. This scheme may possibly be derived from Shepard's method known in the art and described below.

The value predicted at pixel x by Shepard's interpolation may be expressed as the following weighted sum of values in $\hat{A}_{i+1}(x)$:

$$A_{i+1}(x) = \frac{\sum_{r=0}^{N} w(x, x_r) \hat{A}_{i+1}(x_r)}{\sum_{r=0}^{N} w(x, x_r) \chi_{\hat{A}_{i+1}}(x_r)} \quad (3)$$

where $\chi_{\hat{A}}$ is the characteristic function corresponding to $\hat{A}$ ($\chi_{\hat{A}}$ is 1 where $\hat{A}$ is non-zero, 0 otherwise) and w is a Gaussian distance function (affinity kernel) in color space:

$$w(x;y) = \exp(-\|c(x) - c(y)\|^2 / 2\sigma_c^2) \quad (4)$$

Here, c(x) and c(y) are the colors of pixels x and y in the CIE Lab color space.

Denoting by W the all-pairs affinity matrix, $W_{ij} = w(xi; xj)$, eq. (3) can be rewritten as a ratio of matrix-vector products:

$$A_{i+1} = \frac{W \hat{A}_{i+1}}{W \chi_{\hat{A}}} \quad (5)$$

where $A_{i+1}$, $\hat{A}_{i+1}$ and $\chi_{\hat{A}}$ are represented as column vectors. Because of the size of W (N×N, where N is the number of pixels), direct evaluation of eq. (5) is very expensive, but Nyström method may be used to compute an approximation quickly. It is noted that the affinity matrix W is symmetric and thus diagonalizable by orthogonal matrices:

$$W = UDU^T \quad (6)$$

It has also been shown that all-pairs affinity matrices, such as W, have low rank. In other words, W can be well approximated using a small number of eigenvectors. Let $\tilde{D}$ be a diagonal matrix containing all the eigenvalues of D above a certain threshold. W can be approximated by:

$$W \approx U \tilde{D} U^T \quad (7)$$

Nyström method can be used for fast calculation of the eigenvectors of W. Evaluation of eq. (5) now boils down to projecting $\hat{A}_{i+1}$ and $\chi_{\hat{A}}$ onto a small set of eigenvectors (5-10), which correspond to the eigenvalues in $\tilde{D}$. Thus, the resulting cost of the interpolation is linear in the number of pixels in the image.

In practice, in order to decrease the running time of the algorithm, it would be advantageous to work with low resolution adjustment maps. In order to avoid blurring artifacts which arise when applying an up-sampled version of this map to the full resolution frame, it is required to apply the chroma/luminance separation in the following manner: a low resolution adjustment map is applied to a correspondingly down-sampled version of the frame's luminance channel. Next, a piecewise linear curve is fit to model the resulting changes in the frame's luminance.

Finally, the resulting curve is used to adjust the luminance of the original resolution frame. As for the chromatic channels of the frame, they are adjusted using an up-sampled version of the adjustment map. This produces acceptable results, since the human visual system is more sensitive to high frequencies in the monochromatic channel.

Figure 3:
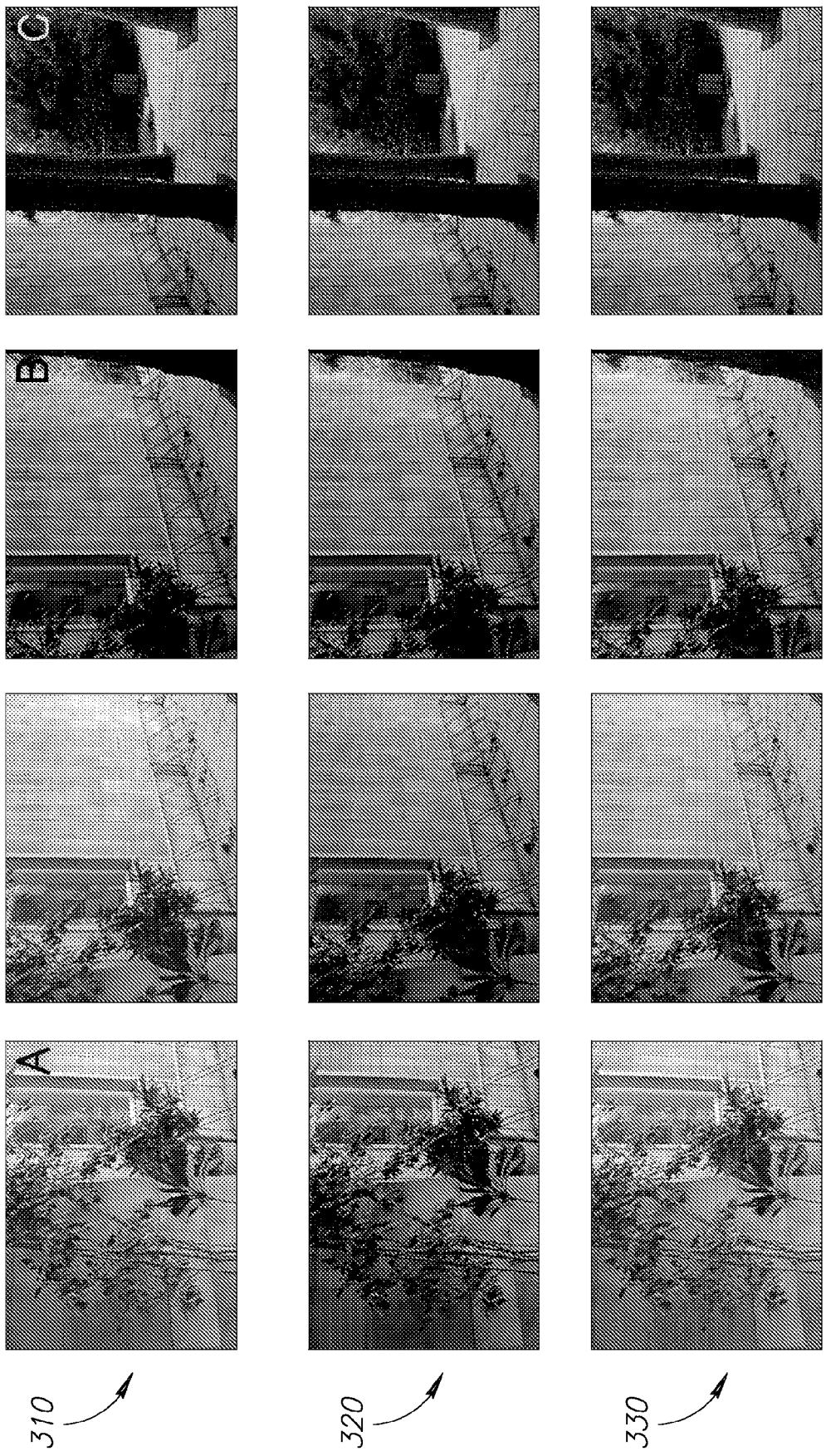
FIG. 3 show exemplary frames processed by embodiments of the present invention.

FIG. 3 shows exemplary frames processed by embodiments of the present invention. Top row 310 shows four sample frames from a sequence with an abrupt color transition. If the frame marked B is selected as an anchor, the entire sequence is aligned to match the tonal characteristics of that frame, as shown in the second row 320. Alternatively, two anchors A and C may be are designated, one on each side of the color fluctuation. Aligning the sequence to each of the two anchors, followed by blending the results produces a stable sequence that avoids the sudden change in color as seen in bottom row 330.

While exact placement of the anchors plays an important role in the final appearance of the resulting video, generally in order to simply attenuate strong tonal shifts, it is enough to delimit parts of the sequence with strong fluctuations by pairs of anchors. This may be done interactively by the user, or automatically by scanning the sequence for areas where the tonal parameters appear to be stable. Beyond the attenuation of undesirable tonal fluctuations, our tonal stabilization method offers another significant advantage: once the video is stabilized one can apply a variety of image processing operations in a consistent manner, since color values in each frame now much more closely correspond to values in another frame. In other words, stabilization makes absolute color values to have consistent meaning throughout the sequence.

Figure 4:
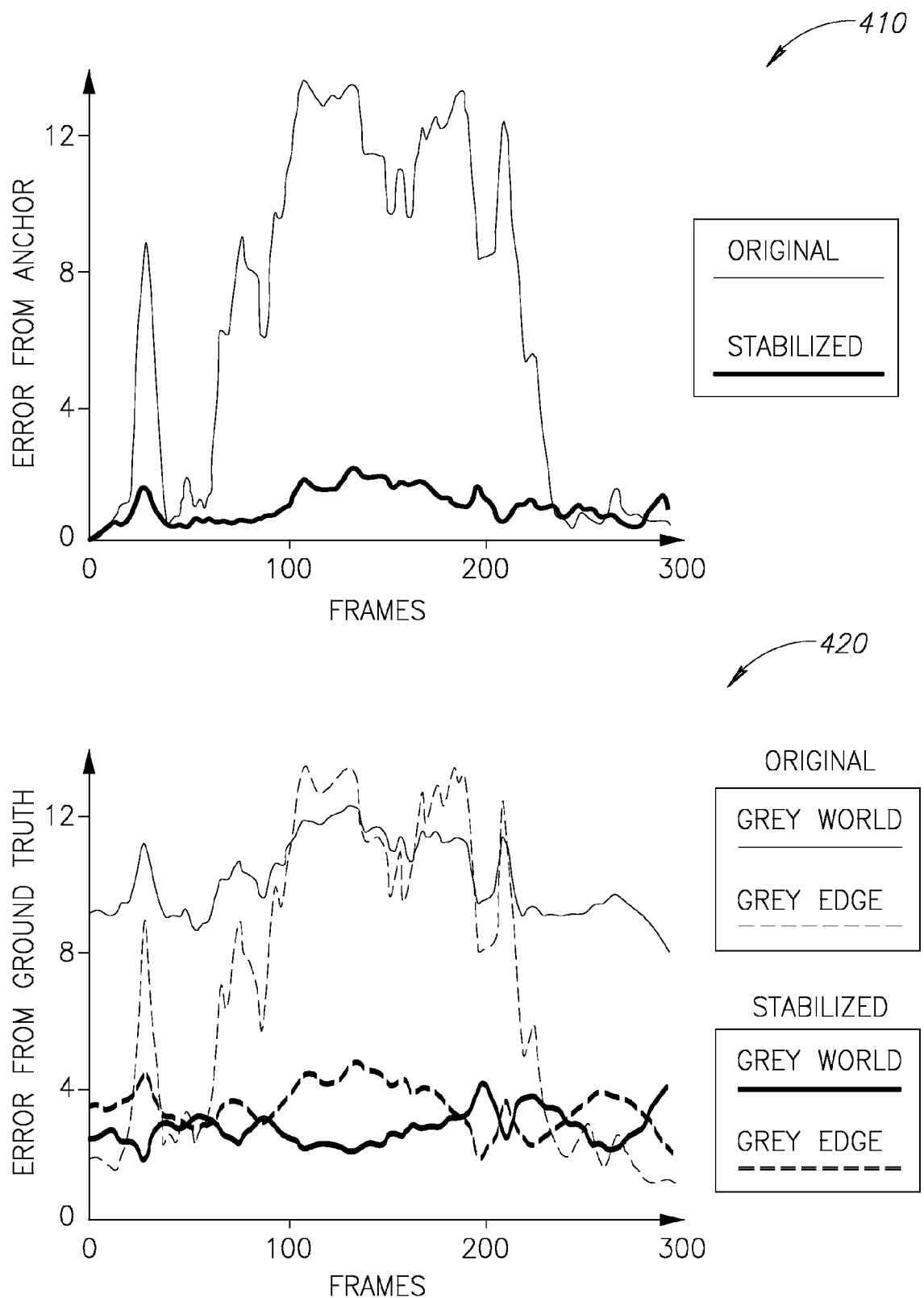
FIG. 4 shows two graphs illustrating an aspect according to some embodiments of the invention.

FIG. 4 shows two graphs illustrating an aspect according to some embodiments of the invention. Graph 410 shows that the stabilization process successfully attenuates strong fluctuations in color. The mean angular error before the stabilization is 6.5°, and reduced to 1.04° after the stabilization.

When operating on the original sequence, averaging over all frames produced very poor results, and better results were obtained by applying the algorithms to each frame independently, so these are the results displayed in graph 420 showing the angular error with respect to the ground truth color of the grey card.

As can be seen in graph 420 for both Grey-World and Grey-Edge methods, stabilizing the sequence prior to applying the white balancing algorithm greatly improves the results. In the case of the Grey-World algorithm, the mean angular error is reduced from 10.25° to 2.82°. In the case of the Grey-Edge method, the mean error is reduced from 6.36° to 3.42°.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. A method of tonally stabilizing a video sequence, the method comprising:
    automatically selecting one or more anchor frames from a sequence of frames;
    obtaining an anchor adjustment map for each selected anchor frame;
    applying an edge-preserving smoothing algorithm to the sequence of frames;
    generating for any given pair of smoothed frames, a robust set of pixels indicating pixels affected by external tonal fluctuation only;
    initializing an adjustment map for any given frame by applying the anchor adjustment map to accumulated color differences between pixels of the robust set of the given frame and the anchor frame; and
    completing the initialized adjustment map by predicting values of pixels in each adjustment map not included in the robust set by applying an interpolation at a color space for these pixels.

2. The method according to claim 1, wherein the obtaining is achieved by generating an anchor adjustment map for each selected anchor frame.

3. The method according to claim 1, further comprising tonally aligning one or more frames of the video sequence with its respective anchor frame by applying the completed adjustment map to its respective frame.

4. The method according to claim 3, further comprising applying one or more predefined image processing algorithms to the tonally aligned sequence of frames.

5. The method according to claim 1, wherein the edge-preserving smoothing algorithm comprises a bilateral filter with a spatial sigma being approximately 10% of the smaller image dimension and wherein a range sigma being approximately 10% of the values ranges.

6. The method according to claim 1, wherein the anchor frames are selected from tonally stable sub sequences of frames in which global tonal fluctuations are below predefined thresholds.

7. The method according to claim 1, wherein the adjustment map specifies for each pixel how its color channels need to be adjusted.

8. The method according to claim 1, wherein the generating of the robust set is achieved by determining the corresponding pixels of any given two smoothed frames whose luminance differ from each other at a predefined threshold or below.

9. The method according to claim 1, wherein the interpolation at the color space is based on global tonal fluctuations accumulated over the sequence of frames.

10. A system for tonally stabilizing a video sequence, the system comprising:
    a computer processor;
    an anchor selection module configured to automatically select one or more anchor frames from a sequence of frames;
    a smoothing module configured to apply an edge-preserving smoothing algorithm to the sequence of frames;

a robust set generator configured to generate for any given pair of smoothed frames, a robust set of pixels indicating pixels affected by external tonal fluctuation only;

an adjustment map initializer configured to initialize an adjustment map for any given frame by applying an anchor adjustment map to accumulated color differences between pixels of the robust set of the given frame and the anchor frame; and an interpolation module configured to complete the initialized adjustment map by predicting values of pixels in each adjustment map not included in the robust set by applying an interpolation at a color space for these pixels, wherein the anchor selection module, the smoothing module, the robust set generator, the adjustment map initializer, and interpolation module are executed by the computer processor.

11. The system according to claim 10, further comprising an anchor adjustment map generator configured to generate the anchor adjustment map for each selected anchor frame.

12. The system according to claim 10, further comprising an alignment module configured to tonally align one or more frames of the video sequence with its respective anchor frame by applying the completed adjustment map to its respective frame.

13. The system according to claim 12, further comprising an image processing module configured to apply one or more predefined image processing algorithms to the tonally aligned sequence of frames.

14. The system according to claim 10, wherein the edge-preserving smoothing algorithm comprises a bilateral filter with a spatial sigma being approximately 10% of the smaller image dimension and wherein a range sigma being approximately 10% of the values ranges.

15. The system according to claim 10, wherein the anchor frames are selected from tonally stable sub sequences of frames in which global tonal fluctuations are below predefined thresholds.

16. The system according to claim 10, wherein the adjustment map specifies for each pixel how its color channels need to be adjusted.

17. The system according to claim 10, wherein the robust set generator is configured to generate of the robust set by determining the corresponding pixels of any given two smoothed frames whose luminance differ from each other at a predefined threshold or below.

18. The system according to claim 10, wherein the interpolation module is configured to apply the interpolation at the color space based on global tonal fluctuations accumulated over the sequence of frames.

19. A computer program product for tonally stabilizing a video sequence, the computer program product comprising:
   a non-transitory computer readable medium having computer readable program embodied therewith, the computer readable program comprising:
   computer readable program configured to automatically select one or more anchor frames from a sequence of frames;
   computer readable program configured to apply an edge-preserving smoothing algorithm to the sequence of frames;
   computer readable program configured to generate for any given pair of smoothed frames, a robust set of pixels indicating pixels affected by external tonal fluctuation only;
   computer readable program configured to initialize an adjustment map for any given frame by applying an anchor adjustment map to accumulated color differences between pixels of the robust set of the given frame and the anchor frame; and
   computer readable program configured to complete the initialized adjustment map by predicting values of pixels in each adjustment map not included in the robust set by applying an interpolation at a color space for these pixels.

20. The computer program product according to claim 19, further comprising computer readable program configured to generate the anchor adjustment map for each selected anchor frame.

21. The computer program product according to claim 19, further comprising computer readable program configured to tonally align one or more frames of the video sequence with its respective anchor frame by applying the completed adjustment map to its respective frame.

22. The computer program product according to claim 21, further comprising computer readable program configured to apply one or more predefined image processing algorithms to the tonally aligned sequence of frames.

* * * * *